United States Patent
Wyatt

[11] 4,129,115
[45] Dec. 12, 1978

[54] RADIANT ENERGY COLLECTOR

[76] Inventor: William G. Wyatt, 8366 Garland Rd., Dallas, Tex. 75218

[21] Appl. No.: 727,125

[22] Filed: Sep. 27, 1976

[51] Int. Cl.² .............................. F24J 3/02; G02B 5/10
[52] U.S. Cl. .................................... 126/270; 350/293; 126/271
[58] Field of Search ................ 126/270, 271; 350/293, 350/294, 299, 310, 190, 288

[56] References Cited

U.S. PATENT DOCUMENTS

| 3,227,153 | 1/1966 | Godel et al. ........................... 126/271 |
| 3,923,381 | 12/1975 | Winston ................................ 126/271 |
| 4,045,246 | 8/1977 | Mlavsky et al. ....................... 126/270 |

FOREIGN PATENT DOCUMENTS 1472267 12/1969 Fed. Rep. of Germany ........... 126/270

*Primary Examiner*—William F. O'Dea
*Assistant Examiner*—Larry Jones
*Attorney, Agent, or Firm*—Jack A. Kanz

[57] ABSTRACT

Disclosed is a radiant energy collector and concentrator having opposed symmetrical concave sides forming a trough. The profile curve of each side wall is comprised of two sections defined by different equations. The top section is a parabola and the bottom section is a straight line or another parabola or other curve.

8 Claims, 3 Drawing Figures

RADIANT ENERGY COLLECTOR

This invention relates to collection and concentration of electromagnetic radiation and conversion thereof to other forms of useful energy. More particularly, it relates to methods and apparatus for utilizing concentrated solar energy and for converting solar energy to other forms of useful energy.

Various schemes have been devised for collecting and concentrating solar energy and converting solar energy to thermal energy for performing useful work. Basically such schemes employ means to direct concentrated sunlight onto a trap containing an energy absorbing fluid such as water. All such prior art proposals, howver, are limited because of basic problems inherent in the collection of solar energy. The most difficult problems encountered are energy loss through re-radiation or reflection of radiant energy from the collector, the usual requirement for apparatus for tracking the sun in its apparent daily motion through the celestial sphere, and energy loss by thermal radiation and thermal conduction from the trap.

Various apparatus have been described in the prior art to reduce the adverse effects of these basic problems. However, none of the prior art systems has adequately solved both the problem of energy loss and solar tracking. Frequently, the solution of one problem tends to enlarge the difficulties posed by the other. For example, systems which permit solar concentration by large factors generally require more careful and frequent diurnal adjustments for solar tracking. Conversely, systems which require little or no diurnal adjustment generally provide the lowest factors of concentration.

U.S. Pat. No. 3,923,381 to Winston describes an energy collection system employing a trough-shaped structure with opposed reflective inner surfaces which guide and concentrate radiant energy impinging on the top opening within a limited field of acceptance. The reflective walls are opposed symmetrical parabolic curves which define a relatively large entrance and a relatively small exit aperture through which radiant energy is directed to a conventional trap.

The collector described in U.S. Pat. No. 3,923,381, however, concentrates and directs radiant energy to a conventional trap. Therefore, while substantially minimizing the need for diurnal tracking and minimizing re-radiation from the collector, the system of Winston does nothing to eliminate re-radiation from the trap and likewise does nothing to assure that the concentrated solar energy is converted to useful energy. Furthermore, the Winston collector is somewhat limited in the angle at which radiant energy may be accepted in the collector. Furthermore, while the parabolic collector described by the Winston patent is a theoretically ideal collector, its design is based on the assumption that all solar energy radiates from a point source. It is well known, however, that because of atmospheric interference, a large portion (from as much as 30% on clear days to as much as 90% on cloudy days) of the radiant solar energy impinging on the entrance aperture of an earth-bound solar collector does not enter the collector directly from the sun. Instead, solar radiation is scattered by the atmosphere, thus such diffuse radiation may appear to radiate from any point in the surrounding atmosphere.

The collector described by the Winston patent will, of course, collect and concentrate all radiant energy which enters the entrance aperture within its angle of acceptance regardless of whether the radiation is direct or diffuse. However, since the theory of the Winston collector is based on the assumption that all solar radiation approaches the collector along a straight line from a moving point source, the angle of acceptance may be small; the major consideration in defining the angle of acceptance being to provide a sationary concentrator which will accept a major portion of the radiation emanating from a traveling point source as the sun appears to move with respect to the stationary earth-bound collector.

In accordance with the present invention, a solar energy concentrating collector having geometrically similar opposed sides is provided which collects radiant energy incident on the entrance aperture within a specified angle of acceptance and concentrates the energy in the plane of the exit aperture. The concentrator also captures some radiation which enters the entrance aperture at angles greater than the specified angle of acceptance. The profile curve of the inner sides of the collector of the invention is a curve comprised of two sections, the equation defining the first section being different from the equation defining the second section. The first section is a parabola and the second section may be a straight line or another parabola or other curve. The first section parabola is a portion of the parabola defined by Winston, supra, to produce the ideal collector. However, to reduce the amount of materials required to construct the concentrator and to permit capture of radiation entering the entrance aperture at angles greater than the angle of acceptance of the concentrator, a portion of the top of the Winston concentrator is removed.

Removing the top portion of the Winston collector body substantially reduces the size of the collector body and thus results in vast savings of material and space. Furthermore, removal of the top portion of the concentrator permits entry of more radiant energy outside the angle of acceptance without materially reducing the concentration ratio. The concentration ratio is not materially reduced since removing the top portion of the concentrator reduces the entrance aperture only slightly. However, removing the top portion of the Winston concentrator permits capture of certain radiant energy entering the concentrator at angles greater than the angle of acceptance.

In order to prevent re-radiation of some of the energy incident on the entrance aperture at angles greater than the angle of acceptance, the profile curve of the lower portion of the inner wall of the concentrator is modified so that some of the energy entering the entrance aperture at angles greater than the angle of acceptance is also captured and directed to the exit aperture. Accordingly, the modified collector of the invention permits capture and concentration of some radiant energy outside the angle of acceptance and thus permits capture and concentration of more diffuse energy as well as direct solar energy at the exit aperture with substantially the same concentration ratio as achieved by the ideal concentrator of Winston, but requires the use of substantially less materials for construction.

Other features and advantages of the invention will become more readily understood when taken in connection with the appended claims and attached drawings, in which:

Since the collector of the present invention is a modification of the collector design described in U.S. Pat. No. 3,923,381 to Winston, the ideal collector described in said patent will be referred to herein as the Winston collector. Accordingly, reference may be had to said U.S. Pat. No. 3,923,381 for detailed mathematical analysis and understanding of the Winston collector design.

Figure 1:
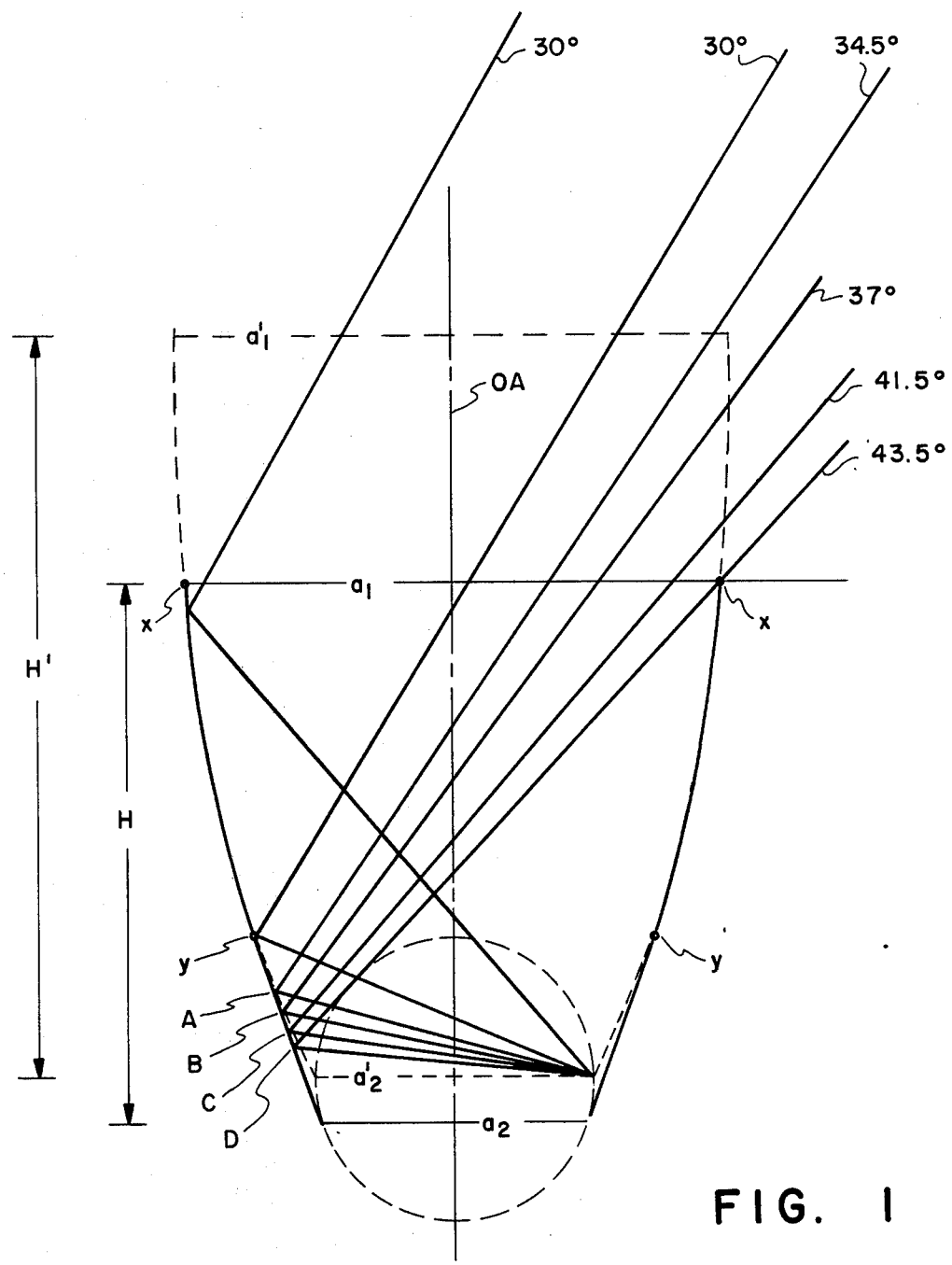
FIG. 1 is a diagrammatic representation of the geometric configuration of one embodiment of the invention.

FIG. 1 illustrates a modification of the Winston collector in accordance with the principles of the present invention superimposed on the Winston collector. In FIG. 1 the Winston collector is shown in dashed lines and the modification of the invention illustrated in solid lines.

The Winston collector is shown in dashed lines in FIG. 1 as an imaginary collector comprising a trough-shaped body having a longitudinally extending entrance aperture with first and second opposing edges separated by a transverse distance $a_1'$, a longitudinally extending exit aperture separated by a transverse distance $a_2'$ and a pair of symmetrical concave walls interconnecting corresponding edges of the apertures. The Winston collector has a field of acceptance for radiant energy and an angular acceptance for radiant energy within said field of acceptance determinable at the entrance aperture, and an optical axis OA determinable by reference to the distances separating the exit and entrance aperture opposing edges. In accordance with the Winston collector design, the ratio of distances $a_2'$ to $a_1'$ is no less than the sine of the angular acceptance. The profile curve of each of the side walls is a parabola having as its parabolic focus the opposing edges of the exit aperture and as its parabolic axis a line forming an angle with the optical axis OA numerically equal to the angular acceptance. The field of acceptance, represented in terms of optical direction cosines, is an elipse of semi-minor axis equal to the sine of the angular acceptance and semi-major axis substantially equal to one. For illustrative purposes, assume the angle of acceptance of the Winston collector shown in FIG. 1 is 30°. Thus, any radiation originating within its field of acceptance and entering the entrance aperture within the 30° angle of acceptance will be directed to the exit aperture either directly or by one or more reflections. Any radiation entering the entrance aperture at an angle greater than the 30° angle of acceptance will be reflected out of the collector.

With the Winston collector illustrated in FIG. 1 having a concentration ratio of 2:1 and an entrance aperture of 4 inches, the height H' of the collector is 5.2 inches. In accordance with the invention the Winston collector of FIG. 1 is modified by removing the top one-third of the side walls. Thus, the height H of the modified collector is 3.46 inches. The profile curve of the inner side walls adjacent the exit aperture is also modified to permit capture of radiation impinging thereon at angles greater than the angle of acceptance.

Referring again to FIG. 1, it will be observed that only that portion of the side walls lying between points X and Y is defined by the parabola of the Winston collector. That portion of the Winston collector above point X is removed and that portion of the side wall between point Y and the exit aperture is a curve defined by an equation different from the equation defining the parabola of the Winston collector. Point Y, however, is determined with reference to the exit aperture $a_2'$ of the imaginary collector and is approximately the point on the parabola at which a straight line tangent to a circle having as its diameter the exit aperture of the imaginary collector is also tangent to the parabola defining the wall of the imaginary collector.

In the embodiment illustrated in FIG. 1, the portion of the side wall between point Y and the exit aperture is a straight line beginning at point Y and terminating at the point where the straight line is tangent to a circle having the exit aperture of the imaginary concentrator as its diameter. The portion of the side wall between point Y and the exit aperture need not be a straight line but may be any curve which lies between the parabola of the imaginary collector and a straight line parallel to the optical axis and passing through point Y. Accordingly, it should be noted that while point Y is defined as approximately the point where a straight line tangent to a circle having the exit aperture of the imaginary concentrator as its diameter is tangent to the parabola of the side wall of the imaginary concentrator, the portion of the side wall between point Y and the exit aperture of the modified concentrator need not be a straight line and need not intersect the parabola tangentially, but must lie below the parabola of the imaginary collector between point Y and the exit aperture.

Since the focus of the parabola between points X and Y is the edge of the opposite side wall defining the exit aperture of the imaginary concentrator (which lies on the parabolic axis of the parabola) all radiant energy entering the entrance aperture within the angle of acceptance (30° in the specific case under discussion) will be directed to the exit aperture either directly or by one or more reflections. However, all radiation entering the concentrator at angles greater than the angle of acceptance and striking the side wall between points X and Y will be reflected out of the collector. By modifying that portion of the side wall between point Y and the exit aperture so that the curve thereof lies below the parabola of the imaginary collector, however, certain radiation entering the entrance aperture at angles greater than the angle of acceptance may also be directed to the exit aperture. For example, in the specific embodiment shown, radiation entering the entrance aperture at an angle of 34.5° strikes the collector wall at point A. If the curvature of the collector wall between point Y and the exit aperture is a continuation of the parabola, such radiation will be reflected back out of the concentrator. However, when the portion of the wall between point Y and the exit aperture is a straight line tangent to the parabola at point Y, radiation impinging on point A at an angle of 34.5° is reflected to the focus of the original parabola and is thus captured. Therefore, all radiation striking point A at an angle of 34.5° or less is captured by the modified collector. Likewise, radiation striking point B at an angle of 37° would be reflected out of the imaginary concentrator. However, in the modified collector all energy striking point B at an angle of 37° or less is captured. Radiation striking point C in the modified collector at an angle of 41.5° or less is likewise captured by the modified concentrator. The maximum angle of capture occurs at point D. Point D is the point at which radiation entering the entrance aperture at point X at an angle of 43.5° strikes the opposite side of the concentrator. Thus all radiation striking point D at an angle of 43.5° or less is captured by the modified concentrator.

Conversely stated, all radiation striking point A or any point between point A and the exit aperture at an angle of 34.5° or less is captured. Likewise, any radiation striking point B or any point between point B and the exit aperture at an angle of 37° or less and any radiation striking the side wall at point C or any point between point C and the exit aperture at an angle of 41.5° or less is captured. It will thus be observed that while the angle of acceptance of the concentrator still remains 30° for radiation striking the walls between point X and point Y, some radiation striking the portion of the concentrator wall between point Y and the exit aperture at angles up to 43.5° is also captured.

Although point Y is defined in terms of a straight line tangent to the parabola and tangent to a circle having the exit aperture of the imaginary concentrator as its diameter, it should be noted that the side wall between point Y and the exit aperture need not be a straight line and that the side wall need not terminate at the point where such straight line is tangent to the said circle. It is only necessary that this portion of the side wall lie below the parabola of the imaginary concentrator so that radiant energy incident thereon will not be reflected out of the concentrator. In the extreme case the portion between point Y and the exit aperture may be a vertical straight line parallel to the optical axis. A side wall defined by any curve lying between said vertical straight line and but not including the parabola of the imaginary collector will capture some radiation outside the angle of acceptance, each of such curves defining a maximum capture angle specific to the curve and the exit aperture.

It should also be noted that point Y need not necessarily be the precise point at which a straight line tangent to a circle having the exit aperture of the imaginary concentrator as its diameter is tangent to the parabola. This definition, however, is a means for readily determining a practical design for the concentrator. The precise location of point Y may vary depending on the requirements of the concentrator to be produced. It will be readily observed that as point Y is moved toward point X, the efficiency of the parabolic portion of the collector is reduced while the angle of capture for radiation striking the lower portion of the side wall is increased. Thus the efficiency of the collector for concentrating diffuse radiation is increased at the expense of efficiency in collecting direct radiation. Conversely, as point Y is moved toward the exit aperture, the ability of the collector to capture diffuse radiation is diminished. Accordingly, point Y is preferable at or reasonably near the point where a straight line tangent to a circle having the exit aperture of the imaginary collector as its diameter is tangent to the parabola, but may be moved either toward the exit aperture or the entrance aperture for collectors with specific applications.

Figure 2:
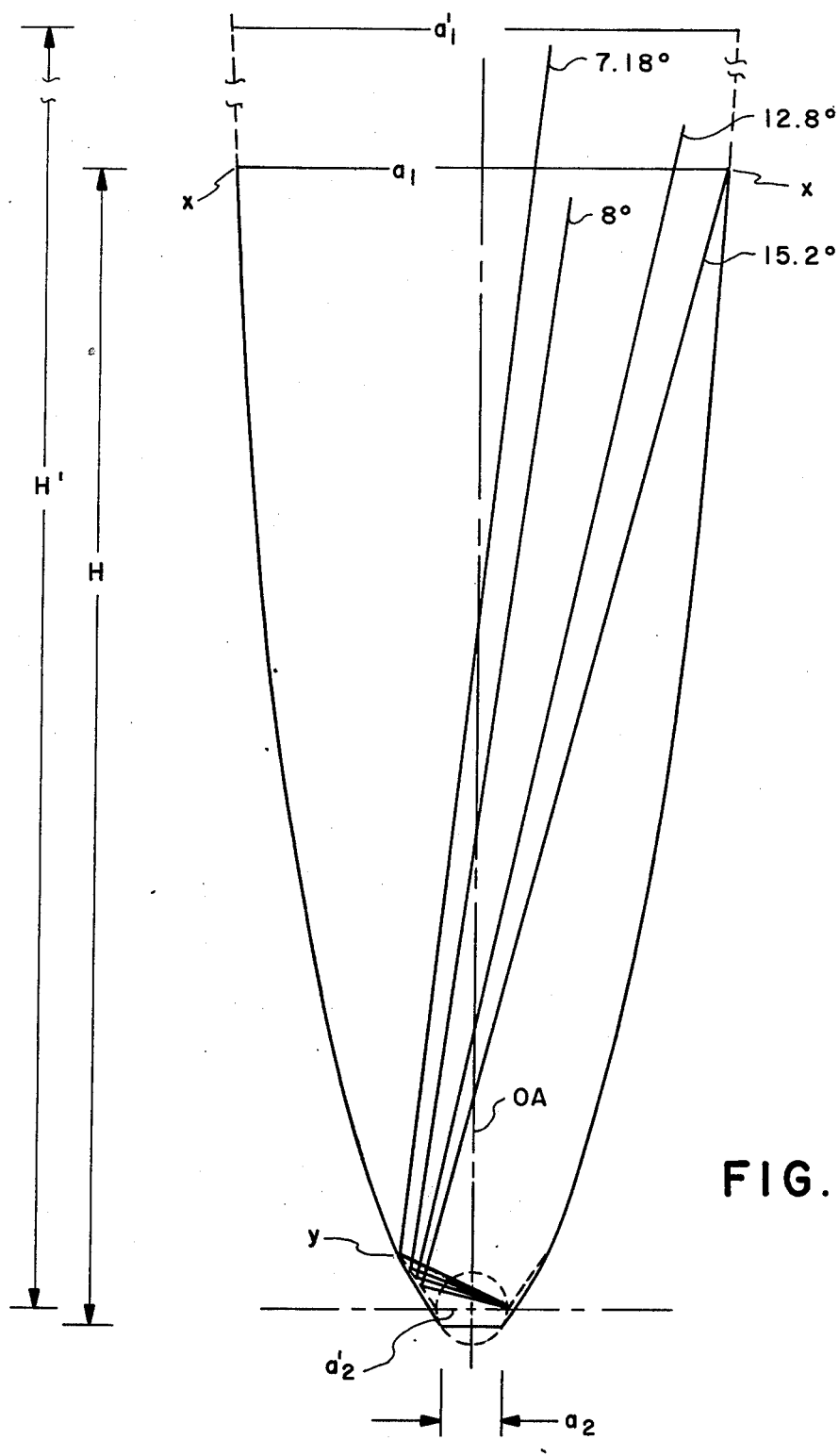
FIG. 2 is a diagrammatic representation of the geometric configuration of an alternative embodiment of the invention.

Referring now to FIG. 2, a similar modified concentrator is illustrated. Again, the Winston collector is shown as an imaginary collector by dashed lines and the modified collector of the invention shown in solid lines. The imaginary collector is an 8:1 concentrator with a height of 17.8 inches and an entrance aperture of 4 inches. The height of the imaginary concentrator is reduced 55.8 percent by removing the top 55.8 percent of the side walls. This reduces the entrance aperture $a_1$ to 3.5 inches resulting in a concentration ratio of 7:1. This reduction in the overall size of the concentrator reduces the amount of material required for constructing the concentrator approximately 50 percent while reducing the amount of solar energy collected by only 12.5 percent.

The portion of the side walls between points X and Y is the parabola defined by the Winston collector side wall and the portion of the side wall between point Y and the exit aperture is a straight line tangent to the parabola at point Y and also tangent to a circle having the exit aperture $a_2'$ of the imaginary collector as its diameter.

Under the conditions given, the imaginary concentrator has an angle of acceptance of 7.18°. As described with reference to FIG. 1, the modified concentrator of FIG. 2 still has an angle of acceptance of 7.18° for that portion of the side wall between points X and Y. However, the modified concentrator captures part of the radiation entering the entrance aperture at angles up to 15.2° which strikes the side wall between point Y and the exit aperture.

Figure 3:
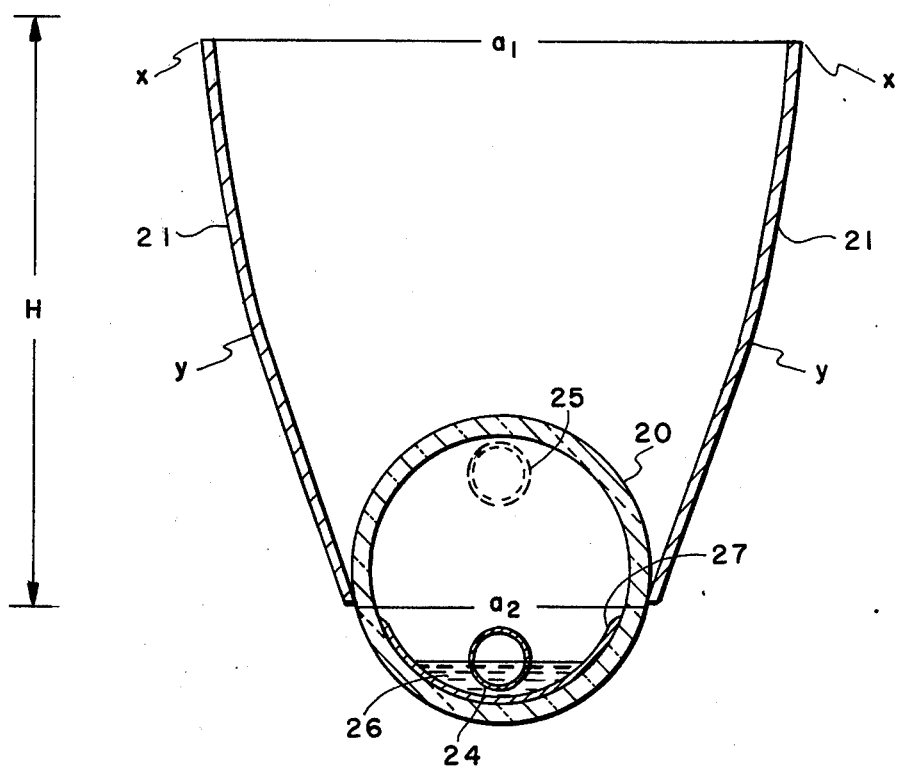
FIG. 3 is a sectional view of a solar energy powered desalinization unit utilizing the principles of the invention.

A desalinization apparatus utilizing the principles of the invention is illustrated in FIG. 3. The apparatus comprises a non-imaging radiant energy concentrator with a tubular conduit positioned within the exit aperture. The concentrator comprises a trough-shaped body having a pair of longitudinally extending symmetrically opposed side members 21, the top opposed edges thereof separated by a transverse distance and defining an entrance aperture $a_1$ and the bottom opposed edges separated by a transverse distance and defining an exit aperture $a_2$. As described hereinabove, the top portions of the side walls 21 are concave and the inner surfaces thereof are reflective and follow the parabola defined by the Winston collector. The portion of the side wall between point Y and the exit aperture is a straight line tangent to the parabola and tangent to a circle having the exit aperture of the imaginary concentrator as its diameter, all as described hereinabove with reference to FIGS. 1 and 2. A cylindrical conduit 20 is positioned longitudinally within the longitudinally extending exit aperture $a_2$ so that the edges of the side walls defining the exit aperture are tangent to the outer periphery of the conduit 20. The conduit 20 is preferably a transparent material such as glass or the like so that at least the portion of conduit 20 which is above the exit aperture is transparent. The portion of the inner surface of the conduit which lies below the exit aperture is preferably coated with a highly absorptive material. The conduit 20 has inlet 24 which may be near the bottom of the conduit and an outlet 25 which may be disposed at the opposite end of the conduit and near the top thereof. Seawater or brackish water 26 is introduced at inlet 24 to form a liquid level in conduit 20 below the exit aperture 25. As explained hereinabove, solar energy entering the concentrator within the angle of acceptance, as well as radiation entering the entrance aperture at angles greater than the angle of acceptance but which is captured by the modified concentrator is reflected toward the exit aperture. The concentrated solar energy thus travels generally from the entrance aperture toward the exit aperture. The concentrated solar energy passes through the transparent conduit 20 and is concentrated in the plane of the exit aperture. The radiation passing through the exit aperture is either absorbed directly by the vapor in the conduit, absorbed by the liquid 26, or absorbed by the absorptive coating 27. As the liquid is heated vapor which rises from the liquid passes through the exit aperture in the direction opposite to the direction of flow of the concentrated radiant energy. Since the concentrated energy is primarily concentrated in the plane of the exit aperture, the vapor may be further heated as it passes through the exit aperture. Accordingly, the temperature of the fluid exiting through exit 25 may be controlled by controlling the level of liquid within the conduit 20 and the pressure in the conduit. When operated as a desalinization unit, the water level is preferably maintained near or slightly below the exit aperture. Thus the vapor may be withdrawn at a temperature of about 212° F. under atmospheric conditions.

The system may, of course, be operated at other pressures. For example, the pressure in conduit 20 may be reduced to lower the boiling point of the water and aid in withdrawing the distilled water. Conversely, the pressure may be controlled to use the vaporized water as a pressurized steam source. It will be observed that as the pressure is increased, the vapor passing through the exit aperture will be more dense. Therefore the vapor passing through the exit aperture, where the radiant energy is most concentrated, will absorb more of the solar energy directly. If desired, the conduit 20 may be completely filled with liquid and the temperature controlled by the rate at which liquid is passed through the conduit. In this manner the fluid flowing through the conduit may be used for various purposes, such as a heat source or the like.

For operation as a continuous desalinization unit the conduit may be provided with a second outlet (not illustrated) below the liquid level so that purified water vapor may be removed through outlet 25 while the impurities are concentrated in the liquid. The liquid containing the concentrated impurities may be continuously withdrawn through the second outlet as seawater or brackish water is continuously added. Various other modifications and variations will be readily apparent to those skilled in the art.

From the foregoing it will be apparent that utilizing the principles of the invention radiant energy concentrator apparatus may be fabricated which employ the parabolic side walls of the Winston collector which are modified to collect much more diffuse radiation. Furthermore, the height of the side walls may be reduced from less than one-third to more than five-eighths, thus resulting in savings on material and space. The concentrators are readily adaptable to various solar energy concentration schemes and may be designed as required to produce very high temperatures or lower temperatures, depending on the requirements of the system in which it is to be used.

It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed is:

1. A non-imaging radiant energy concentrator comprising a trough-shaped body having a pair of longitudinally extending symmetrically opposed side members, the top opposed edges of said side members separated by a transverse distance and defining an entrance aperture and the bottom opposing edges separated by a transverse distance and defining an exit aperture, the internal surface of said side members having a concave portion adjacent the top edge, the concave portion being that portion of a parabola lying between points X and Y on a parabola defined by the walls of an imaginary concentrator comprising a trough-shaped body having a longitudinally extending entrance aperture with first and second opposing edges separated by a transverse distance $a_1'$, a longitudinally extending exit aperture separated by a transverse distance $a_2'$ and a pair of symmetrical concave walls interconnecting laterally corresponding edges of said apertures, a field of acceptance for radiant energy, an angular acceptance for radiant energy within said field of acceptance and determinable at said entrance aperture of said imaginary concentrator, and an optical axis determinable by reference to distances separating entrance and exit aperture opposing edges of said imaginary concentrator, wherein the ratio of distances $a_2'$ to $a_1'$ is no less than the sine of said angular acceptance, the profile curve of each of said side walls of said imaginary concentrator is a parabola having as its parabolic focus the opposing edge of said exit aperture of said imaginary concentrator and as its parabolic axis a line forming an angle with said optical axis of the imaginary concentrator body numerically equal to said angular acceptance, and the field of acceptance of the imaginary concentrator body, when represented in terms of optical direction cosines, is an elipse of semi-minor axis equal to the sine of said angular acceptance and semi-major axis substantially equal to one, wherein Y is a point on said parabola approximately at which a straight line tangent to a circle having the exit aperture of said imaginary concentrator as its diameter is also tangent to said parabola and X is a point on said parabola between point Y and the entrance aperture edge of said side walls of said imaginary concentrator and wherein the profile curve of each side wall member between point Y and the exit aperture edge is a curve lying between and including a straight line parallel with the optical axis of said imaginary concentrator but not including a continuation of said parabola; whereby radiation entering the concentrator at angles greater than the angle of acceptance of said imaginary concentrator and striking the side wall of the concentrator between point Y and the exit aperture may be reflected to the exit aperture and captured.

2. A non-imaging radiant energy concentrator as defined in claim 1 wherein the profile curve of said side members between point Y and the exit aperture edge is a straight line tangent to said parabola at point Y and tangent to a circle having the exit aperture of said imaginary concentrator at its diameter.

3. A non-imaging radiant energy concentrator as defined in claim 1 wherein the distance of point X from the entrance aperture edge of said imaginary concentrator is approximately one-third to five-eighths the distance from the entrance aperture edge to the exit aperture edge of said imaginary concentrator.

4. A non-imaging radiant energy concentrator as defined in claim 1 wherein the exit aperture is no greater than the exit aperture of said imaginary concentrator.

5. A non-imaging radiant energy concentrator as defined in claim 1 including a conduit positioned within said exit aperture with its central axis substantially parallel with the edges of said side members.

6. A non-imaging radiant energy concentrator as defined in claim 5 wherein that portion of said conduit lying above the plane of said exit aperture is transparent.

7. A non-imaging radiant energy concentrator as defined in claim 5 wherein at least a portion of the conduit lying below the plane of the exit aperture is not transparent.

8. A non-imaging radiant energy concentrator as defined in claim 5 including means for passing a fluid through said conduit.

* * * * *